United States Patent
Ren et al.

(10) Patent No.: US 11,580,745 B2
(45) Date of Patent: Feb. 14, 2023

(54) VIDEO VISUAL RELATION DETECTION METHODS AND SYSTEMS

(71) Applicant: NATIONAL UNIVERSITY OF SINGAPORE, Singapore (SG)

(72) Inventors: Tongwei Ren, Nanjing (CN); Jingfan Guo, Nanjing (CN); Tat-Seng Chua, Singapore (SG); Xindi Shang, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 26 days.

(21) Appl. No.: 16/639,420

(22) PCT Filed: Aug. 17, 2018

(86) PCT No.: PCT/SG2018/050420
§ 371 (c)(1),
(2) Date: Feb. 14, 2020

(87) PCT Pub. No.: WO2019/035771
PCT Pub. Date: Feb. 21, 2019

(65) Prior Publication Data
US 2021/0133461 A1 May 6, 2021

Related U.S. Application Data

(60) Provisional application No. 62/546,641, filed on Aug. 17, 2017.

(51) Int. Cl.
*G06V 20/40* (2022.01)
*G06T 7/11* (2017.01)
*G06T 7/246* (2017.01)

(52) U.S. Cl.
CPC ............. *G06V 20/49* (2022.01); *G06T 7/11* (2017.01); *G06T 7/246* (2017.01); *G06V 20/46* (2022.01)

(58) Field of Classification Search
CPC ........... G06T 2207/30241; G06T 7/292; G06T 2207/20076; G06T 7/11; G06T 2210/12;
(Continued)

(56) References Cited

U.S. PATENT DOCUMENTS 6,295,367 B1 * 9/2001 Crabtree ................. G06T 7/162
382/103
7,930,204 B1 * 4/2011 Sharma ............... G06Q 30/0203
705/7.32

(Continued)

FOREIGN PATENT DOCUMENTS

| CN | 108229272 A | 6/2018 |
|---|---|---|
| KR | 1020170084657 A | 7/2017 |
| WO | WO-2017009649 A1 | 1/2017 |

OTHER PUBLICATIONS

Zhang H. et al., "Visual Translation Embedding Network for Visual Relation Detection", 2017 IEEE Conference on Computer Vision and Pattern Recognition (CVPR), Jul. 26, 2017, pp. 3107-3115 [Retrieved on Nov. 1, 2018] <DOI: 10.1109/CVPR.2017.331 >.
(Continued)

*Primary Examiner* — Kenny A Cese
(74) *Attorney, Agent, or Firm* — Harness, Dickey & Pierce, P.L.C.

(57) ABSTRACT

Methods and systems for detecting visual relations in a video are disclosed. A method comprises: decomposing the video sequence into a plurality of segments; for each segment, detecting objects in frames of the segment; tracking the detected objects over the segment to form a set of object tracklets for the segment; for the detected objects, extracting object features; for pairs of object tracklets of the set of object tracklets, extracting relativity features indicative of a relation between the objects corresponding to the pair of object tracklets; forming relation feature vectors for pairs of object tracklets using the object features of objects corre- (Continued)

sponding to respective pairs of object tracklets and the relativity features of the respective pairs of object tracklets; and generating a set of segment relation prediction results from the relation features vectors; generating a set of visual relation instances for the video sequence by merging the segment prediction results from different segments; and generating a set of visual relation detection results from the set of visual relation instances.

20 Claims, 12 Drawing Sheets

(58) Field of Classification Search
CPC ............... G06T 7/246; G06K 9/00771; G06K 9/00536; G06K 9/00765; G06V 20/49; G06V 20/46
See application file for complete search history.

(56) References Cited

U.S. PATENT DOCUMENTS

| | | | | |
|---|---|---|---|---|
| 8,358,691 | B1* | 1/2013 | Wang | G06T 7/12 382/199 |
| 2010/0316298 | A1* | 12/2010 | Swaminathan | G06V 10/7557 382/209 |
| 2014/0180063 | A1* | 6/2014 | Zhao | A61B 1/0005 600/424 |
| 2014/0321704 | A1* | 10/2014 | Partis | G06K 9/6296 382/103 |
| 2017/0357855 | A1 | 12/2017 | Kusumoto | |
| 2018/0218515 | A1* | 8/2018 | Terekhov | G06V 20/40 |
| 2018/0268563 | A1* | 9/2018 | Chen | G06T 7/194 |
| 2018/0276845 | A1* | 9/2018 | Bjorgvinsdottir | G06N 3/084 |
| 2018/0286199 | A1* | 10/2018 | Chen | G06T 7/215 |

OTHER PUBLICATIONS

Lin D. et al., "Visual semantic search: retrieving videos via complex textual queries", Proceedings of IEEE Conference on Computer Vision and Pattern Recognition, Jun. 28, 2014, pp. 2657-2664 [Retrieved on Nov. 1, 2018] <DOI: 10.1109/CVPR.2014.340>.

Shang X. et al., "Video Visual Relation Detection", Proceedings of the 2017 ACM on Multimedia Conference, Oct. 27, 2017, pp. 1300-1308 [Retrieved on Nov. 1, 2018] <DOI: 10.1145/3123266.3123380>.

International Search Report and Written Opinion of the International Searching Authority issued in PCT/SG2018/050420, dated Nov. 22, 2018; ISA/SG.

* cited by examiner

VIDEO VISUAL RELATION DETECTION METHODS AND SYSTEMS

CROSS-REFERENCE TO RELATED APPLICATIONS

This application is a U.S. National Phase Application under 35 U.S.C. 371 of International Application No. PCT/SG2018/050420 filed on Aug. 17, 2018, which claims the benefit of U.S. Provisional Patent Application No. 62/546,641 filed on Aug. 17, 2017. The entire disclosure of all of the above applications are incorporated herein by reference.

FIELD OF THE INVENTION

The present disclosure relates to video analysis and in particular to the detection of visual relations between objects in a video sequence.

BACKGROUND OF THE INVENTION

Bridging the gap between vision and language is essential in multimedia analysis, which has attracted a lot of research effort ranging from visual concept annotations, semantic description with captioning, and visual question-answering. Visual relation detection (VRD), a recent effort in offering more comprehensive understanding of visual content beyond objects, aims to capture the various interactions between objects. It may effectively underpin numerous visual-language tasks, such as captioning, visual search, and visual question answering.

Visual relation involves a pair of objects localized by bounding boxes together with a predicate to connect them. FIG. 1a shows several examples of visual relations, in which two objects can be connected with various predicates and the same predicate can connect different object pairs with different appearances. As shown in FIG. 1a, the visual relation between a first person 112 and a first dog 114, the visual relation between a second person 122 and a second dog 124, the visual relation between a person 132 and motorcycle 134, and the visual relation between a person 142 and a horse 144 may be determined by VRD. In this disclosure, we use the term relation triplet to denote a type of visual relation represented by a unique combination of <subject, predicate, object> as a triplet. Due to the combinatorial complexity, the possible space for relation triplets is much larger than that of objects. Because of this, existing methods that could obtain significant performance in object detection, are not applicable to VRD. Several methods have been proposed for VRD. However, they all applied to still images only. Compared to still images, videos provide a more natural set of features for detecting visual relations, such as the dynamic interactions between objects.

Recent research works have focused efforts on VRD in images. It has been commonly observed that a fundamental challenge in VRD lies on how to model and predict the huge number of relations by learning from few training examples. To tackle the problem, most existing methods separately predict the subject, predicate and object in the visual relation triplet, reducing the complexity from $O(N^2K)$ to $O(N+K)$, where N and K are the numbers of objects and predicates respectively. Some of these methods further improve the performance by leveraging language prior and regularizing relation embedding space. Extracting relation related features is another crux of VRD. Recent research has used coordinate or binary mask-based features to enhance the performance of detecting spatial relation. The visual feature level connection among the components of relation triplets has also been studied to exploit additional statistical dependency but requires $O(NK)$ parameters for the modeling.

Video object detection aims to detect objects belonging to the pre-defined categories and localize them with bounding box trajectories in a given video. The state-of-the-art methods address this problem by integrating the latest techniques in both image object detection and multi-object tracking. Recent sophisticated deep neural networks have achieved mature performances in image object detection. However, object detection in videos still suffers from low accuracy, because of the existence of blur, camera motion and occlusion in videos, which hamper accurate object localization with bounding box trajectories. On the other hand, multi-object tracking with tracking-by-detection strategy tends to generate short trajectories due to the high miss detection rate of object detectors, and thus additional merging algorithms are developed to obtain more temporally consistent object trajectories.

SUMMARY OF THE INVENTION

According to a first aspect of the present disclosure a a video processing method of detecting visual relations in a video sequence is provided. The method comprises decomposing the video sequence into a plurality of segments; for each segment, detecting objects in frames of the segment; tracking the detected objects over the segment to form a set of object tracklets for the segment; for the detected objects, extracting object features; for pairs of object tracklets of the set of object tracklets, extracting relativity features indicative of a relation between the objects corresponding to the pair of object tracklets; forming relation feature vectors for pairs of object tracklets using the object features of objects corresponding to respective pairs of object tracklets and the relativity features of the respective pairs of object tracklets; and generating a set of segment relation prediction results from the relation features vectors; generating a set of visual relation instances for the video sequence by merging the segment prediction results from different segments; and generating a set of visual relation detection results from the set of visual relation instances.

The plurality of segments may be overlapping segments.

The visual relation detection results may comprise a set of indications of a relation subject, a relation predicate and a relation object, wherein the relation subject and the relation object are detected objects and the relation predicate indicates a relation between the relation subject and the relation object.

The object tracklets may comprise a bounding box in each of a plurality of frames of the segment and a trajectory for the bounding box across the plurality of frames of the segment.

The relation between the objects corresponding to the pair of object tracklets, may comprise at least one of the relative size, the relative position and the motion between the pair of objects corresponding to the pair of object tracklets.

In an embodiment, generating the set of visual relation detection results from the set of visual relation instances comprises ranking the visual relation instances according to a confidence score and selecting the visual relation instances having the highest confidence scores as the visual relation detection results.

In an embodiment, merging the segment prediction results from different segments comprises applying a greedy algorithm to merge pairs of object tracklets across successive segments.

In an embodiment, generating the set of segment relation prediction results from the relation features vectors comprises applying a softmax function to set of relation feature vectors.

In an embodiment, detecting objects in frames of the segment comprises detecting objects belonging to one of a set of pre-defined categories.

The visual relations may comprise at least one dynamic relation which changes across the video sequence.

According to a second aspect of the present disclosure a video processing system is provided. The video processing system comprises a processor and a data storage device. The data storage device stores computer executable instructions operable by the processor to; decompose a video sequence into a plurality of segments; for each segment, detect objects in frames of the segment; track the detected objects over the segment to form a set of object tracklets for the segment; for the detected objects, extract object features; for pairs of object tracklets of the set of object tracklets, extract relativity features indicative of a relation between the objects corresponding to the pair of object tracklets; form relation feature vectors for pairs of object tracklets using the object features of objects corresponding to respective pairs of object tracklets and the relativity features of the respective pairs of object tracklets; and generate a set of segment relation prediction results from the relation features vectors; generate a set of visual relation instances for the video sequence by merging the segment prediction results from different segments; and generate a set of visual relation detection results from the set of visual relation instances.

According to a yet further aspect, there is provided a non-transitory computer-readable medium. The computer-readable medium has stored thereon program instructions for causing at least one processor to perform operations of a method disclosed above.

BRIEF DESCRIPTION OF THE DRAWINGS

In the following, embodiments of the present invention will be described as non-limiting examples with reference to the accompanying drawings in which.

DETAILED DESCRIPTION

In the present disclosure, we propose a novel vision technique named Video Visual Relation Detection (VidVRD) to perform visual relation detection in videos instead of still images (ImgVRD). As compared to still images, videos provide a more natural set of features for detecting visual relations, in which features like the dynamic interactions between objects enable visual relations like "A-follow-B" and "A-towards-B" to be detected in videos. However, VidVRD is more technically challenging than ImgVRD due to the difficulties in accurate object tracking and diverse relation appearances in the video domain. To this end, we propose a VidVRD method, which consists of object tracklet proposal, short-term relation prediction and greedy relational association. Moreover, we contribute the first dataset for VidVRD evaluation, which contains 1,000 videos with manually labeled visual relations, to validate our proposed method. On this dataset, our method achieves the best performance in comparison with the state-of-the-art baselines. It may effectively underpin numerous visual-language tasks, such as captioning, visual search, and visual question-answering.

Figure 1A:
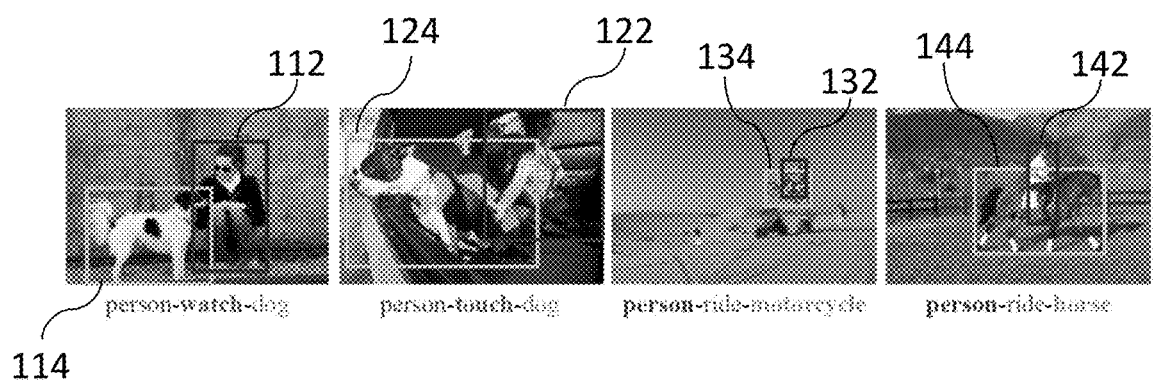
FIG. 1a shows several examples of visual relations between two objects.
Figure 1B:
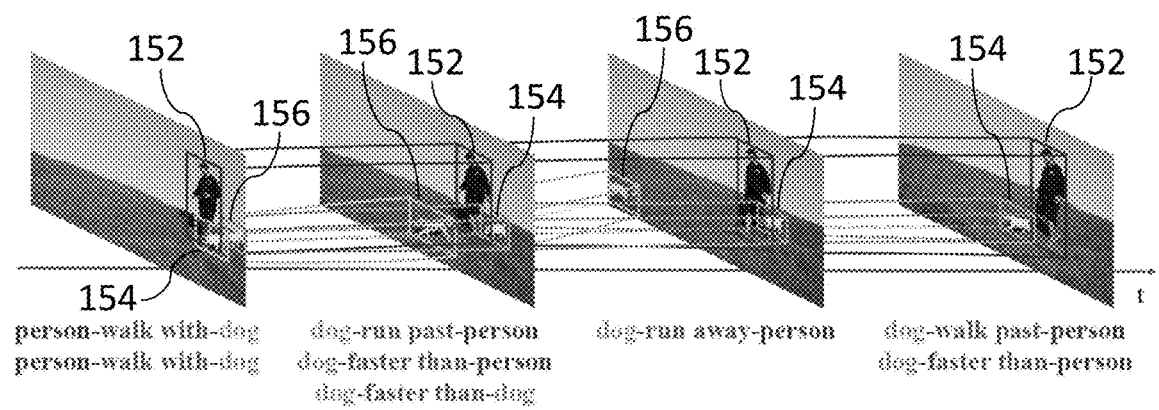
FIG. 1b shows an example of video visual relation detection results from a method according to an embodiment of the present invention.

FIG. 1b shows an example of video visual relation detection results from a method according to an embodiment of the present invention. FIG. 1b shows a video sequence of a person 152, a first dog 154 and a second dog 156.

As shown in FIG. 1b, motion features extracted from spatial temporal content in videos help to disambiguate similar predicates, such as "walk" and "run". Meanwhile, some visual relations such as the dynamic relations can only be detected in videos, such as "dog-run past-person" and "dog-faster than-person". Hence, video visual relation detection (VidVRD) is a more general and feasible task as compared to ImgVRD. Another significant difference between VidVRD and ImgVRD is that the visual relations in a video are usually changeable over time while that of images are fixed. The objects may be occluded or out of frame temporarily, which causes the occurrence and disappearance of visual relations. Even when two objects consistently appearing in the same video frames, the interactions between them may be temporally changed.

Figure 1C:
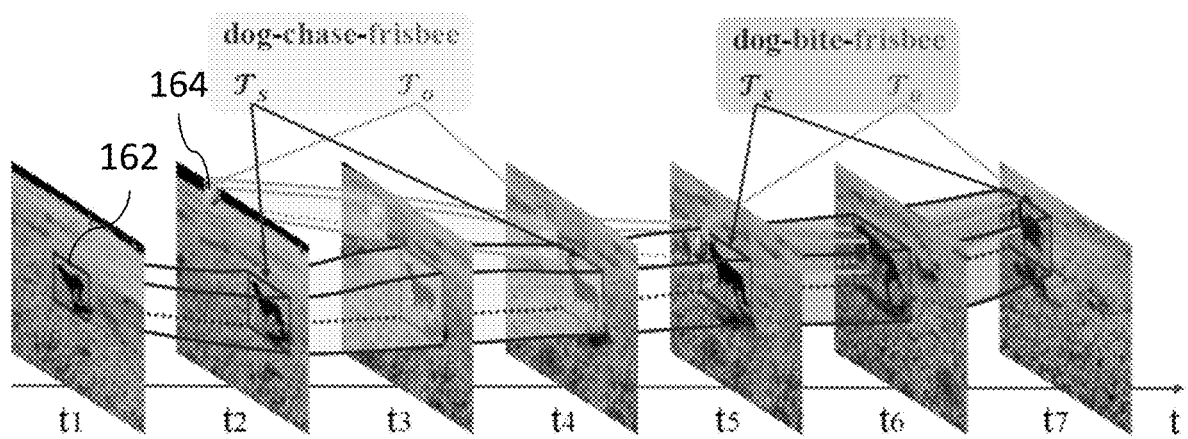
FIG. 1c shows an example of temporally changing visual relation between two objects within a video.

FIG. 1c shows an example of temporally changing visual relation between two objects within a video. In the video illustrated in FIG. 1c a dog 162 and a frisbee 164 are simultaneously appearing between t2 and t7 while their interaction changes from chase to bite. Hence, the VidVRD task should be re-dened to handle the changeability in visual relations.

To be consistent with the definition of ImgVRD, we dene the VidVRD task as follows: Given a set of object categories of interest $\mathcal{C}$ and predicate categories of interest $\mathcal{P}$, VidVRD is to detect instances of visual relations of interest $\mathcal{C} \times \mathcal{P} \times \mathcal{C}$ in a video, where a visual relation instance is represented by a relation triplet <subject, predicate, object>$\in \mathcal{C} \times \mathcal{P} \times \mathcal{C}$ with the trajectories of the subject and object, $\mathcal{T}_s$ and $\mathcal{T}_o$. Specifically, $\mathcal{T}_s$ and $\mathcal{T}_o$ are two sequences of bounding boxes, that respectively enclose the subject and object, within the maximal duration of the visual relation. In FIG.

1c, two visual relation instances in the given video can be represented with the relation triplets, "dog-chase-frisbee" and "dog-bite-frisbee", and the dog and frisbee are localized with the red and green trajectories between ($t_2$, $t_4$) and ($t_5$, $t_7$), respectively.

Compared to ImgVRD, VidVRD faces more technical challenges. First, VidVRD requires localization of objects with bounding box trajectories. This is more difficult than providing a bounding box for each object in ImgVRD, because the accuracy of an object bounding box trajectory is influenced by both the performances of object localization on each frame and object tracking. Our proposed VidVRD method tackles the difficulty by generating the object tracklets within each of overlapping short segments of a video, and then associating them into the object trajectories based on predicted visual relations. Second, VidVRD needs to temporally localize the visual relations within maximal duration. For this purpose, we propose a greedy association algorithm that merges the detected visual relation instances in adjacent segments if they have the identical relation triplets and their object tracklets have sufficiently high overlaps. Third, VidVRD needs to predict more types of visual relations than ImgVRD because some visual relations can only be detected in videos, such as "A-towards-B" and "A-faster than-B". For effective relation prediction, we propose a relation prediction model, which extracts multiple features from the subject/object tracklet pairs. The features include appearance, motion, and relative characteristics. We encode these features into a relation feature, and predict visual relations using separate subject, predicate and object predictors.

As far as we know, there is no dataset for VidVRD, although several datasets for ImgVRD exist. Hence, we construct a VidVRD dataset for evaluation. We design a predicate description mechanism and construct the dataset from ILSVRC2016-VID. It contains 1,000 videos with manually labeled visual relations and object bounding box trajectories. On the dataset, we validate the performance of our proposed VidVRD method. The experimental results show that our method outperforms the state-of-the-art baselines.

A major challenge of VidVRD is to handle the changeability of visual relations over time. To this end, we propose a VidVRD method that detects visual relation instances in short-term, followed by an association algorithm to form the overall visual relation instances in a video. The assumption behind the proposed method is that the basic visual relations can always be recognized in a short duration, while more complicated relations can be inferred from the sequence of basic visual relations. Detecting visual relations in short-term can also help to detect the emergence and disappearance of the visual relations in a video, and alleviate the computational burden of directly analyzing over long term duration. The following description introduces the details of the method and systems for implementing the method.

Figure 2:
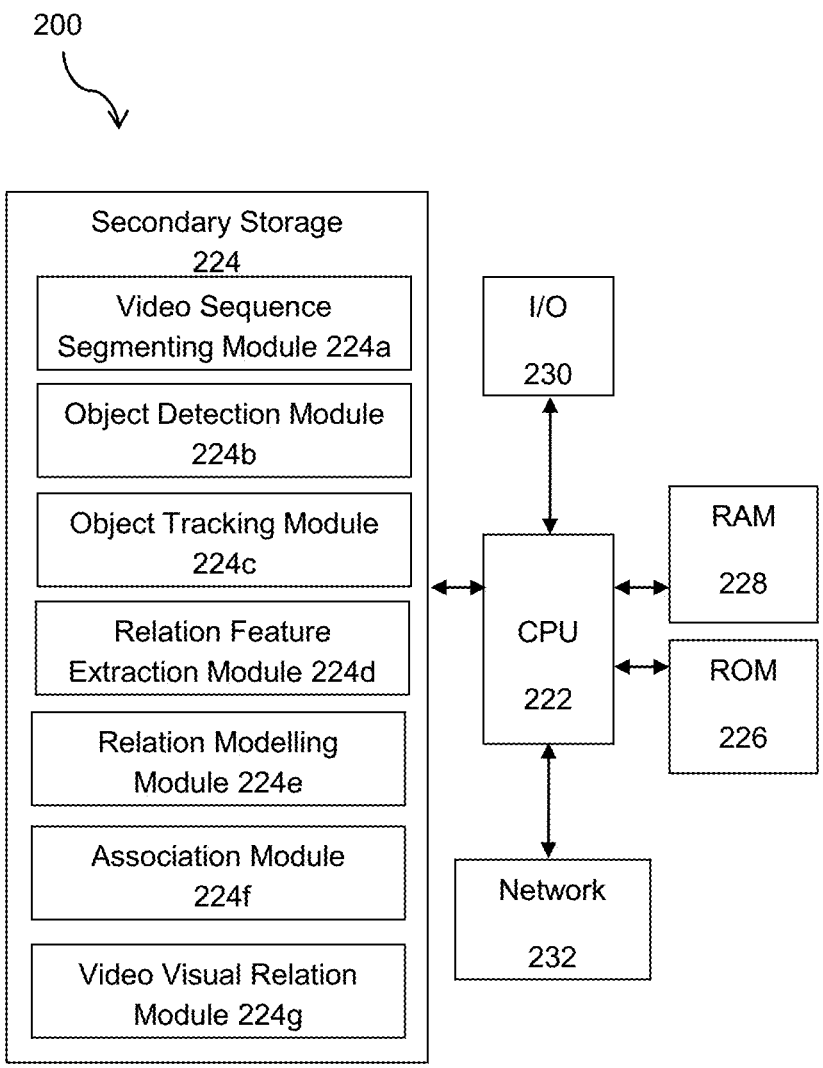
FIG. 2 is a block diagram showing a technical architecture of a video processing system according to an embodiment of the present invention.

FIG. 2 is a block diagram showing a technical architecture 200 of a video processing system according to an embodiment of the present invention. Typically, the video visual relation detection methods according to embodiments of the present invention are implemented on a computer, or a number of computers, each having a data-processing unit. The block diagram as shown in FIG. 2 illustrates a technical architecture 200 of a computer which is suitable for implementing one or more embodiments herein.

The technical architecture 200 includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture 220 may further comprise input/output (I/O) devices 230, and network connectivity devices 232. The technical architecture 200 further comprises activity table storage 240 which may be implemented as a hard disk drive or other type of storage device.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. In this embodiment, the secondary storage 224 has a video sequence segmenting module 224a, an objection detection module 224b, an object tracking module 224c, a relation feature extraction module 224d, a relation modelling module 224e, an association module 224f, and a video visual relation module 224g comprising non-transitory instructions operative by the processor 222 to perform various operations of the methods of the present disclosure. As depicted in FIG. 2, the modules 224a-224g are distinct modules which perform respective functions implemented by the video processing system. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 224a-224g is described herein, these may alternatively be implemented as one or more hardware modules (such as field-programmable gate array(s) or application-specific integrated circuit(s)) comprising circuitry which implements equivalent functionality to that implemented in software. The ROM 226 is used to store instructions and perhaps data which are read during program execution. The secondary storage 224, the RAM 228, and/or the ROM 226 may be referred to in some contexts as computer readable storage media and/or non-transitory computer readable media.

The I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the method operations described herein. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 200, at least one of the CPU 222, the RAM 228, and the ROM 226 are changed, transforming the technical architecture 200 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 200 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 200 to provide the functionality of a number of servers that is not directly bound to the number of computers in the technical architecture 200. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

Figure 3:
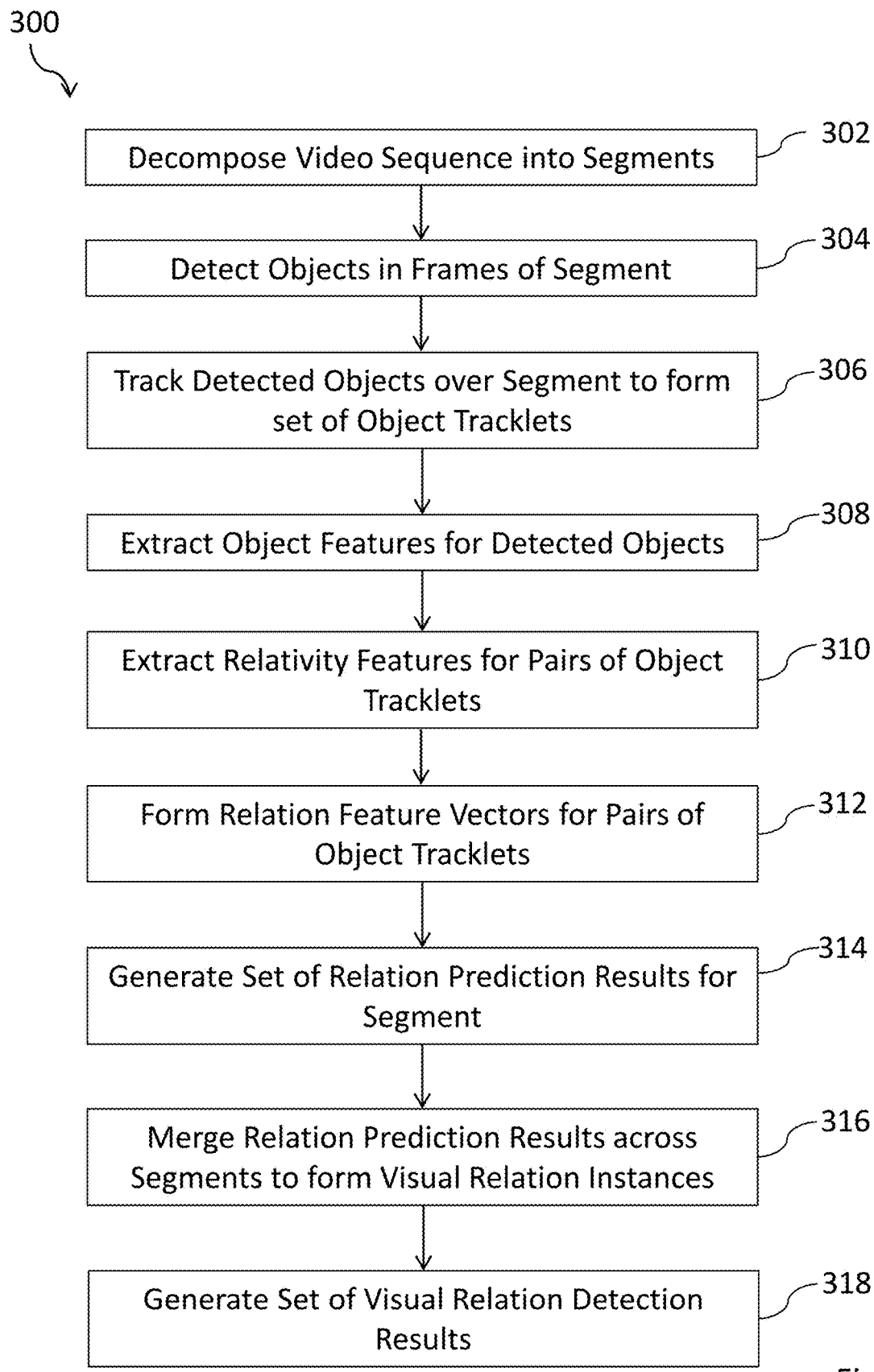
FIG. 3 is a flowchart showing a video visual relation detection method according to an embodiment of the present invention.

FIG. 3 is a flowchart showing a video visual relation detection method according to an embodiment of the present invention. The method 300 is carried out on the video processing system 200 shown in FIG. 2. The method 300 is carried out on a video sequence which comprise a plurality of frames and comprises footage of a number of objects.

In step 302, the video sequence segmenting module 224a of the video processing system 200 decomposes the input video sequence into a plurality of segments. The video sequence is divided into segments of length L with L/2 overlapping frames. For example, L may take the value 30.

Figures 4A, 4B, 4C:
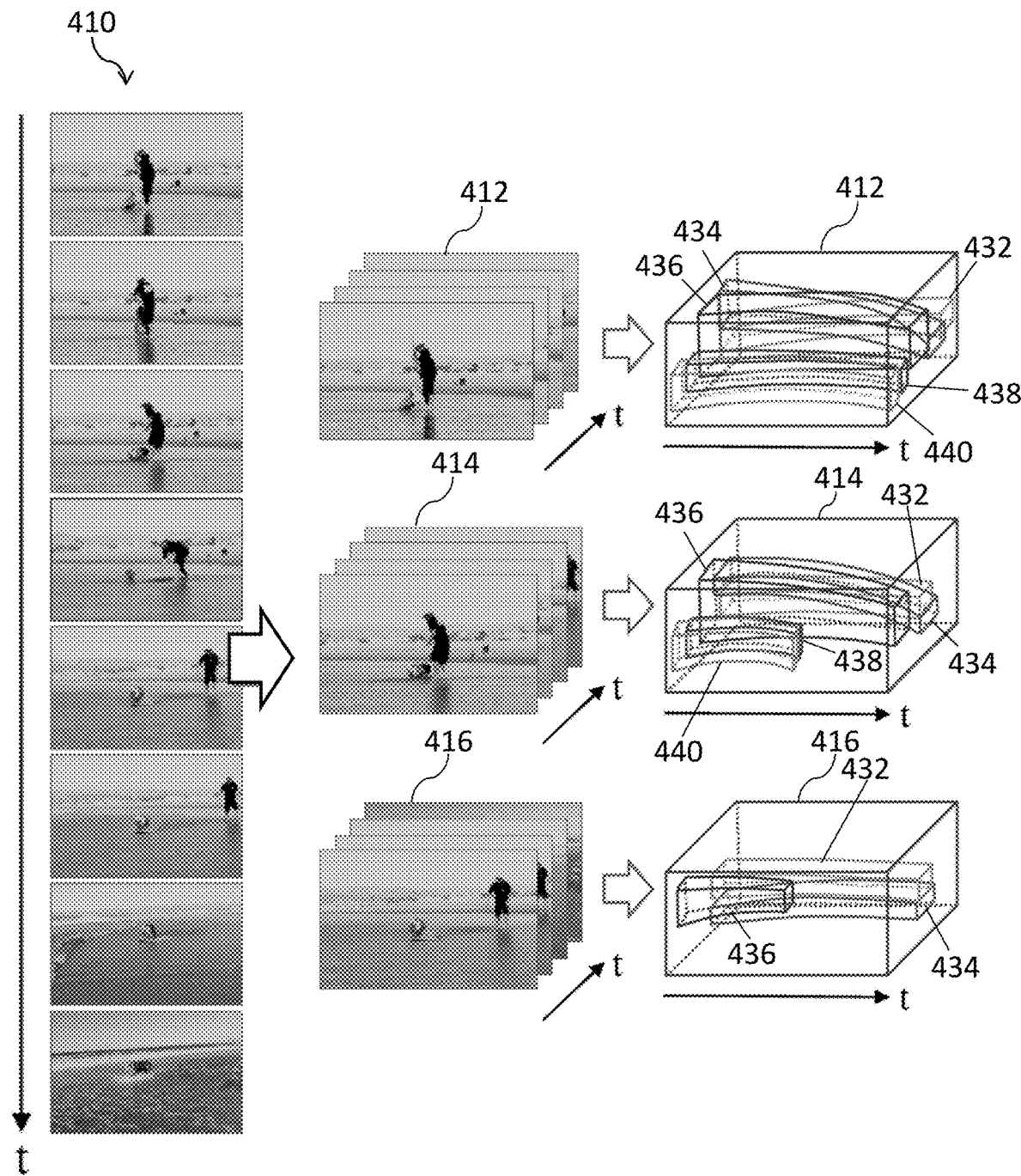
FIG. 4a shows an example input video sequence.
FIG. 4b shows the example input video sequence decomposed into a plurality of segments.
FIG. 4c shows object tracklet proposals generated for the segments of the example input video sequence.

FIG. 4a shows an example input video sequence with reference to which a video visual relation detection method according to an embodiment of the present invention will be described. The example input video sequence 410 shows a person and two dogs in the sea near a beach. The example input video sequence 410 comprises 8 frames, however, it will be appreciated that the frames shown are for illustrative purposes and video sequences with different number of frames may be used and the segment lengths in the processing may also be varied.

FIG. 4b shows the example input video sequence decomposed into a plurality of segments. In this example, the example input video sequence 410 is decomposed into 3 segments: a first segment 412, a second segment 414 and a third 416. Each segment comprises 4 frames. Each segment overlaps with the preceding and following segment. The first two frames of the second segment 414 correspond to the last two frames of the first segment 412. The first two frames of the third segment 416 correspond to the last two frames of the second segment 414. Thus, there is an overlap of 2 frames between segments. In this example each segment has a length L=4 and there is an overlap of L/2=2 frames between segments.

Returning now to FIG. 3, in step 304, the object detection module 224b of the video processing system 200 detects objects in the frame of each segment of the video sequence. In the example embodiment, an object detector for the 35 categories used in our dataset is employed to detect objects in the segment frames. The object detector is trained using a Faster-RCNN detector as described in Shaoqing Ren, Kaiming He, Ross Girshick, and Jian Sun: "Faster r-cnn: Towards real-time object detection with region proposal networks", Advances in Neural Information Processing Systems. 2015 IEEE, 91-99. The training was carried out using with ResNet101 as described in Kaiming He, Xiangyu Zhang, Shaoqing Ren, and Jian Sun: "Deep residual learning for image recognition", IEEE Conference on Computer Vision and Pattern Recognition 2016. IEEE, 770-778.

In step 306, the object tracking module 224c of the video processing system 200 tracks the detected objects to form tracklets in each segment. The frame-level detection results are tracked across the segment using the efficient implementation of robust visual tracking described in Martin Danelljan, Gustav Hager, Fahad Khan, and Michael Felsberg: "Accurate scale estimation for robust visual tracking", British Machine Vision Conference, Nottingham, Sep. 1-5, 2014. BMVA Press. To reduce the number of overlapping proposals, we perform non-maximum suppression (NMS) with vIoU>0.5 on the generated tracklets, where vIoU denotes the voluminal intersection over union of two tracklets. As a result, we generate 19.7 object tracklet proposals per segment on average.

FIG. 4c shows object tracklet proposals generated for the segments of the example input video sequence. As shown in FIG. 4c object tracklets are formed for each segment as a sequence of bounding boxes corresponding to the objects detected in the frames of each sequence.

As shown in FIG. 4c, the first segment 412 has a tracklet for a first dog 432, a tracklet for a surfboard or skateboard 434, a tracklet for a first person 436, a tracklet for a second person 438 and a tracklet for a second dog 440. Each of the tracklets comprises a sequence of bounding boxes in the frames of the first segment 412. Each of the tracklets in the first segment 412 run through all of the frames of the first segment 412. The second segment 414 segment has the tracklet for the first dog 432, the tracklet for the surfboard or skateboard 434, the tracklet for the first person 436, the tracklet for the second person 438 and the tracklet for the second dog 440. The tracklet for the second person 438 and the tracklet for the second dog 440 end approximately halfway through the second segment 414. The tracklet for the first dog 432, the tracklet for the surfboard or skateboard 434 and the tracklet for the first person 436 run though all of the frames of the second segment 414. The third segment 416 has the tracklet for the first dog 432, the tracklet for the surfboard or skateboard 434, and the tracklet for the first person 436. The tracklet for the first person ends halfway though the third segment 416 and the tracklet for the first dog 432 and the tracklet for the surfboard or skateboard 434 runs through all of the frames of the third segment 416.

Returning now to FIG. 3, in step 308, the relation feature extraction module 224*d* of the video processing system 200 extracts features for the detected objects in each segment.

Suppose ($\mathcal{T}_s$, $\mathcal{T}_o$) are a pair of object tracklet proposals in a segment, each of which is in the form of a sequence of bounding boxes. Predicting the relation triplet <subject, predicate, object> involves recognizing the object categories of $\mathcal{T}_s$ and $\mathcal{T}_o$, and the interactions between them. In practice, it is impossible to learn a separate predictor for each single relation due to the huge number of relations and insufficiency of training data. Our model learns separate subject, predicate and object predictors to reduce the modeling complexity and exploit the common components in various relations. The model also leverages a rich relation feature that combines the appearance and motion characteristics of the subject and object, as well as the relative characteristics between them.

In step 308, the object features for $\mathcal{T}_s$ and $\mathcal{T}_o$ are extracted to describe their appearance and motion characteristics. In particular, we first extract the improved dense trajectory (iDT) features with Histogram of Oriented Gradient (HOG), Histogram of Optical Flow (HOF) and Motion Boundary Histogram (MBH) in the segments, which capture both the motion and low-level visual characteristics of the objects. To encode the features, we train a codebook for each of the four descriptor types in iDT using 100,000 randomly sampled features. The size of each codebook is set to 1,000. Then the object feature for $\mathcal{T}$ is computed as a bag of iDT features enclosed in $\mathcal{T}$, where half of an iDT locates within the area of $\mathcal{T}$ is considered as being enclosed. Additionally, we append the object feature with a classeme feature, which is a N-d vector of classification probabilities (i.e., N classes) predicted by deep neural networks, to encode the semantic attributes in the visual appearance.

Figure 4D:
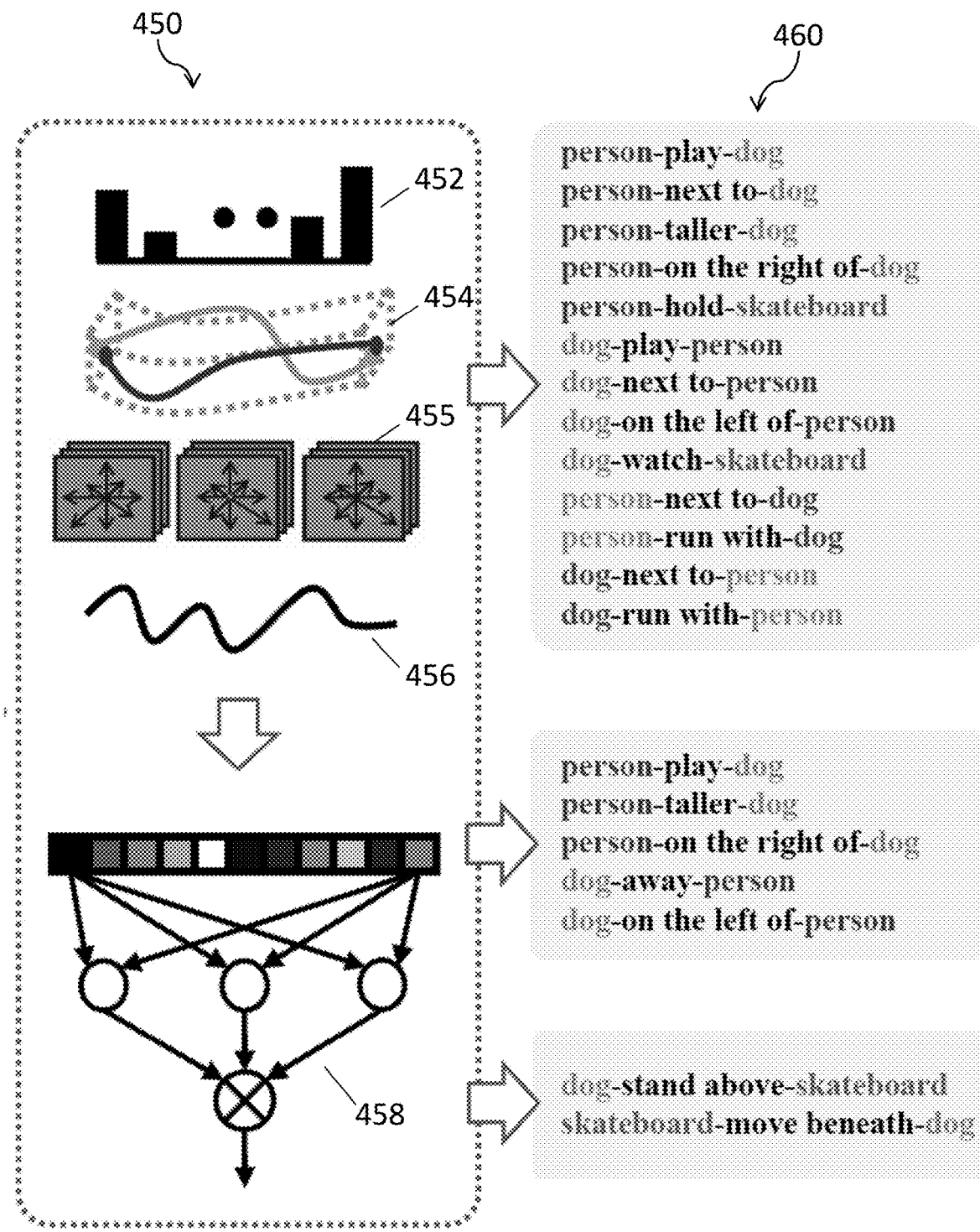
FIG. 4d illustrates relational prediction carried out for the segments of the example input video sequence.

FIG. 4*d* illustrates the relational prediction carried out for the segments of the example input video sequence. As shown in FIG. 4*d*, the relational feature extraction 450 comprises extracting object features 452, features of the tracklets 454, and dense trajectory features 455. Relativity features 456 are also extracted. Relational modelling 458 is used to determine short term relations 460 from the relativity features 456.

Returning now to FIG. 3, in step 310, the relation feature extraction module 224*d* of the video processing system 200 extracts relativity features for pairs of object tracklets in each segment. To extract the relative characteristics between $\mathcal{T}_s$ and $\mathcal{T}_o$, we propose a relativity feature which describes the relative position, size and motion between the two objects. Denoting $C_s^t=(x_s^t, y_s^t)$ and $S_s^t=(w_s^t, h_s^t)$ as the central point and size of $\mathcal{T}_s$ at time t respectively (resp. $\mathcal{T}_o$), we compute the relative position $\Delta C$, relative size $\Delta S$ and relative motion $\Delta M$ descriptors as $$\Delta C = (C_s^1 - C_o^1, \ldots, C_s^L C_o^L),$$

$$\Delta S = (S_a^1 - S_o^1, \ldots, S_a^L - S_o^L),$$

$$\Delta M = (\Delta C^2 - \Delta C^1, \ldots, \Delta C^L - \Delta C^{L-1}). \quad (1)$$

In order to characterize the abundant spatial relations, such as "behind", "larger", "past", as well as their various combinations, such as "past behind", we use dictionary learning to train a codebook for each type of descriptor. Specifically, for each codebook, we set the size to 1,000 and randomly sample 100,000 descriptors for training. The elements in the obtained codebooks can be interpreted as the atomic relative features, so that complicated relative features can be represented by their linear combination. For a pair of $\mathcal{T}_s$ and $\mathcal{T}_o$, the proposed relativity feature is the concatenation of three sparse representations with respect to the corresponding codebooks.

In step 312, the relation modelling module 224*e* of the video processing system 200 forms relation feature vectors for pairs of object tracklets. The overall relation feature vector for a pair of object tracklet proposals is the concatenation of the object features of $\mathcal{T}_s$ and $\mathcal{T}_o$ and their relativity feature.

In step 314, the relation modelling module 224*e* of the video processing system 200 generates a set of relation prediction results for each segment. Given a relation feature, our relation model predicts the likely relation triplets by integrating the scores of subject, predicate and object predictors. One approach to our relation modeling is to train the predictors under separate training criteria. However, the predictors trained in this way will produce different types of scores under independent scales, which makes the integrated score less discriminative to the co-occurrence of subjects, predicates and objects. For example, the scores of impossible relation triplets, such as "cat-drive-car", may not be guaranteed to be lower than those of other possible relation triplets.

In order to produce good ranked scores for relations, we jointly train the predictors under a unified training loss. In particular, we integrate the scores by multiplication, and formulate the training objective to classify among the observed relations $\mathcal{R}$ in the training data:

$$L = \sum_{(s_i, p_j, o_k)} -\log \text{softmax}_\mathcal{R}(P^s(f, s_i) \cdot P^p(f, p_j) \cdot P^o(f, o_k)), \quad (2)$$

where f is the relation feature of a specific relation <$s_i$, $p_j$, $o_k$>, and $P^s$, $P^p$, $P^o$ are respectively the predictors for subject, predicate and object. Since we are only interested in the top relation prediction scores, we use softmax loss which has recently been proved to be effective in this case, both theoretically and empirically. In the experiments, we will keep the top 20 prediction results for each pair ($\mathcal{T}_s^t$, $\mathcal{T}_o^t$), and the top 200 ones for each segment.

To obtain the training samples, we sample pairs of object tracklet proposals that overlap with a ground truth pair, where each tracklet of a pair overlaps with the ground truth in vIoU larger than 0.5, and extract the relation feature for each pair.

In step 316, the association module 224*f* of the video processing system 200 merges relation prediction results across segments to form visual relation instances. After obtaining the relation prediction results for all the pairs of object tracklet proposals, we adopt a relational association algorithm to merge the relations detected in short-term. Supposing there is a sequence of short-term visual relation instances $\{(c^t, <s, p, o>, (\mathcal{T}_s^t, \mathcal{T}_o^t))\}_t$ (t=m, . . . , n) detected from the m-th segment to the n-th segment, which have identical relation triplet <s, p, o> and with sufficient overlapping between successive ones, our goal is to merge them into a single visual relation instance $(\hat{c}, <s, p, o>, (\hat{\mathcal{T}}_s, \hat{\mathcal{T}}_o))$ with confidence score:

$$\hat{c} = \frac{1}{n-m+1} \sum_{t=m}^{n} c^t, \quad (3)$$

where $c^t$ is the short-term score predicted by our relation model. We propose a greedy algorithm for relational association, which repeatedly merges two most condent visual relation instances that overlap in two successive segments. The greedy strategy can help to generate longer visual relation instances, so that the subject and object of each relation instance are temporally localized more accurately. We also average the bounding boxes in the overlapping region of two associated tracklets to get a robust estimation of the $(\hat{\mathcal{T}}_s, \hat{\mathcal{T}}_o)$. The pseudocodes for the relational association are given in Algorithm 1.

---

Algorithm 1. Greedy Relational Association Alogorithm

Input: the set of all detected short-term relation instances
$S = \{(c, \langle s, p, o \rangle, (\mathcal{T}_s, \mathcal{T}_o))\}$
Output: the set of merged instances $\mathcal{L} =$
$\{(\hat{c}, \langle s, p, o \rangle, (\hat{\mathcal{T}}_s, \hat{\mathcal{T}}_o))\}$
Initialize: $\mathcal{L} = \emptyset, \gamma = 0.5$
for t = 1, ..., T do
  $\mathcal{A}$ = instances in $\mathcal{L}$ that end at the (t − 1)-th segment
  $\mathcal{B}$ = instances in $S$ that detected at the t-th segment
  Descending sort $\mathcal{A}$ accordint to $\hat{c}$
  Descending sort $\mathcal{B}$ accordint to c
  for (c, $\langle$ s, p, o$\rangle$, $(\mathcal{T}_s, \mathcal{T}_o))$ in $\mathcal{B}$ do
    for $(\hat{c}', \langle$ s', p', o'$\rangle, (\hat{\mathcal{T}}'_s, \hat{\mathcal{T}}'_o))$ in $\mathcal{A}$ do
      if $\langle$ s, p, o$\rangle = \langle$ s', p', o'$\rangle$ AND
vIoU$(\mathcal{T}_s, \hat{\mathcal{T}}'_s) > \gamma$ AND vIoU$(\mathcal{T}_o, \hat{\mathcal{T}}'_o) > \gamma$ then
        Recompute $\hat{c}'$ using Eq. (3)
        Append $(\mathcal{T}_s, \mathcal{T}_o)$ to $(\hat{\mathcal{T}}'_s, \hat{\mathcal{T}}'_o)$
        Remove $(\hat{c}', \langle$ s', p', o'$\rangle, (\hat{\mathcal{T}}'_s, \hat{\mathcal{T}}'_o))$ from $\mathcal{A}$
        Break
      end if
    end for
    if NOT merged then
      Add (c, $\langle$ s, p, o$\rangle$, $(\mathcal{T}_s, \mathcal{T}_o)$) to $\mathcal{L}$
    end if
  end for
end for

---

Figure 4E:
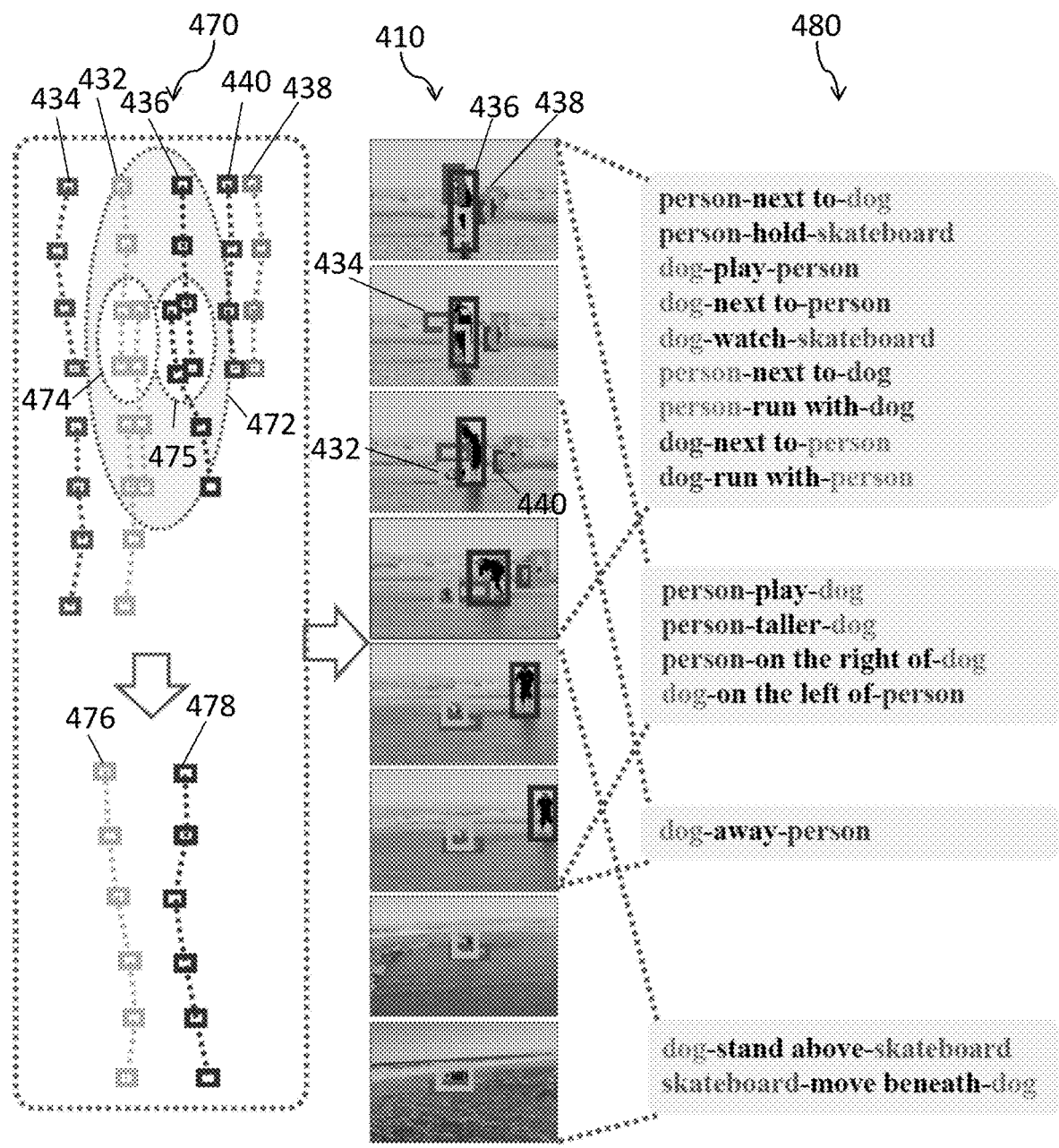
FIG. 4e illustrates a process of merging tracklets across segments for the example input video sequence.

FIG. 4e illustrates the process of merging tracklets across segments for the example input video sequence. The tracklets 470 include the tracklet for the first dog 432, the tracklet for the surfboard or skateboard 434, the tracklet for the first person 436, the tracklet for the second person 438 and the tracklet for the second dog 440. In this example, there are overlapping tracklets in the region 472. In the overlapping region 472, the overlapping part 474 of the tracklet for the first dog 432 is averaged to form a merged tracklet for the first dog 476 and the overlapping part 475 of the tracklet for the first person 436 is averaged to form a merged tracklet for the first person 478.

FIG. 4e also shows the example input video sequence 410 with bounding boxes for the first dog 432, the surfboard or skateboard 434, first person 436, the second person 438 and the second dog 440. The detected short term visual relations 480 are also shown in FIG. 4e.

Returning again to FIG. 3, in step 318, the video visual relation module 224g of the video processing system generates a set of visual relation detection results. After merging all possible visual relation instances, we rank them according to their confidence scores $\hat{c}$ and output the most condent ones as the visual relation detection results for the video.

Figure 5:
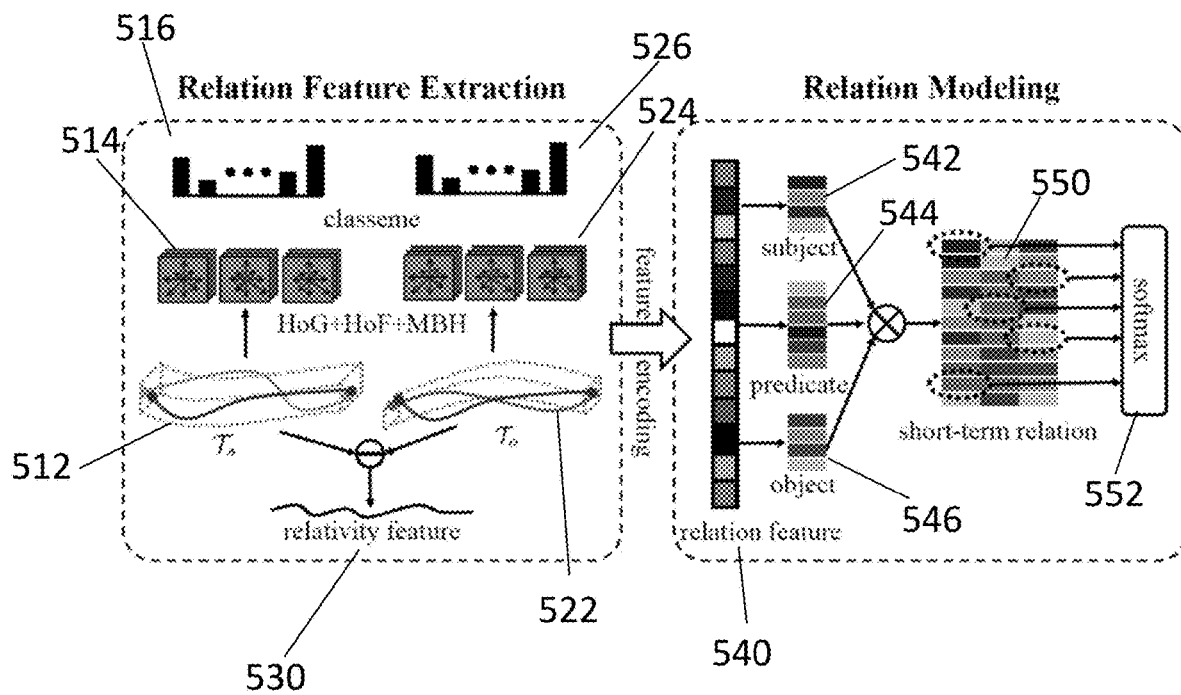
FIG. 5 schematically illustrates relation prediction used in embodiments of the present invention.
Figure 6:
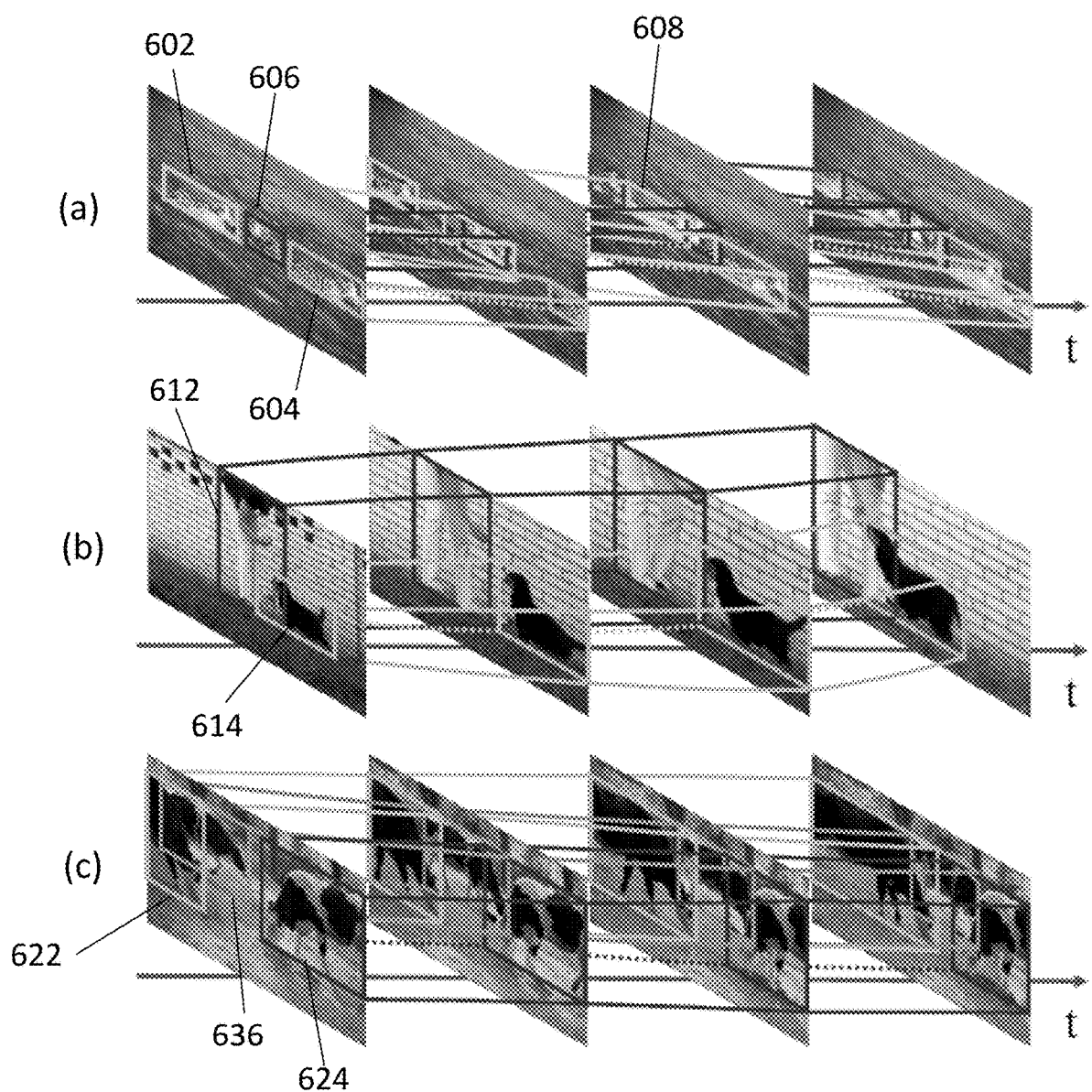
FIGS. 6a to 6c show video sequences used for qualitative comparisons of visual relation detection.
Figure 7:
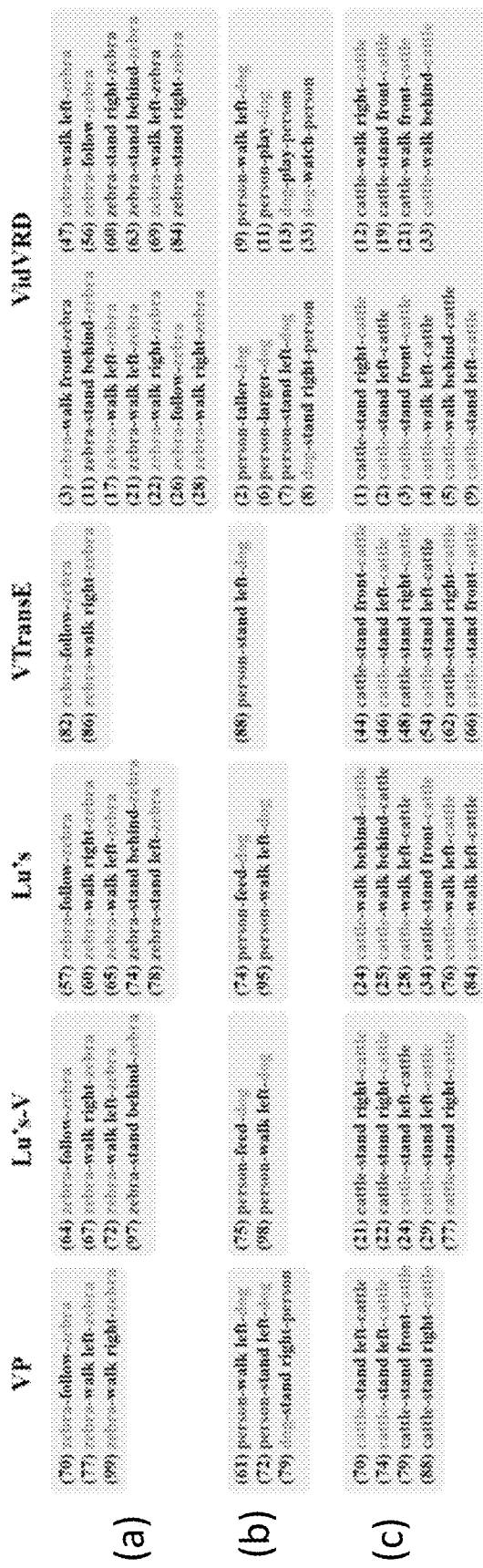
FIGS. 7a to 7c show the visual relation instances detected by different methods for the video sequences shown in FIGS. 6a to 6c respectively.
Figure 8:
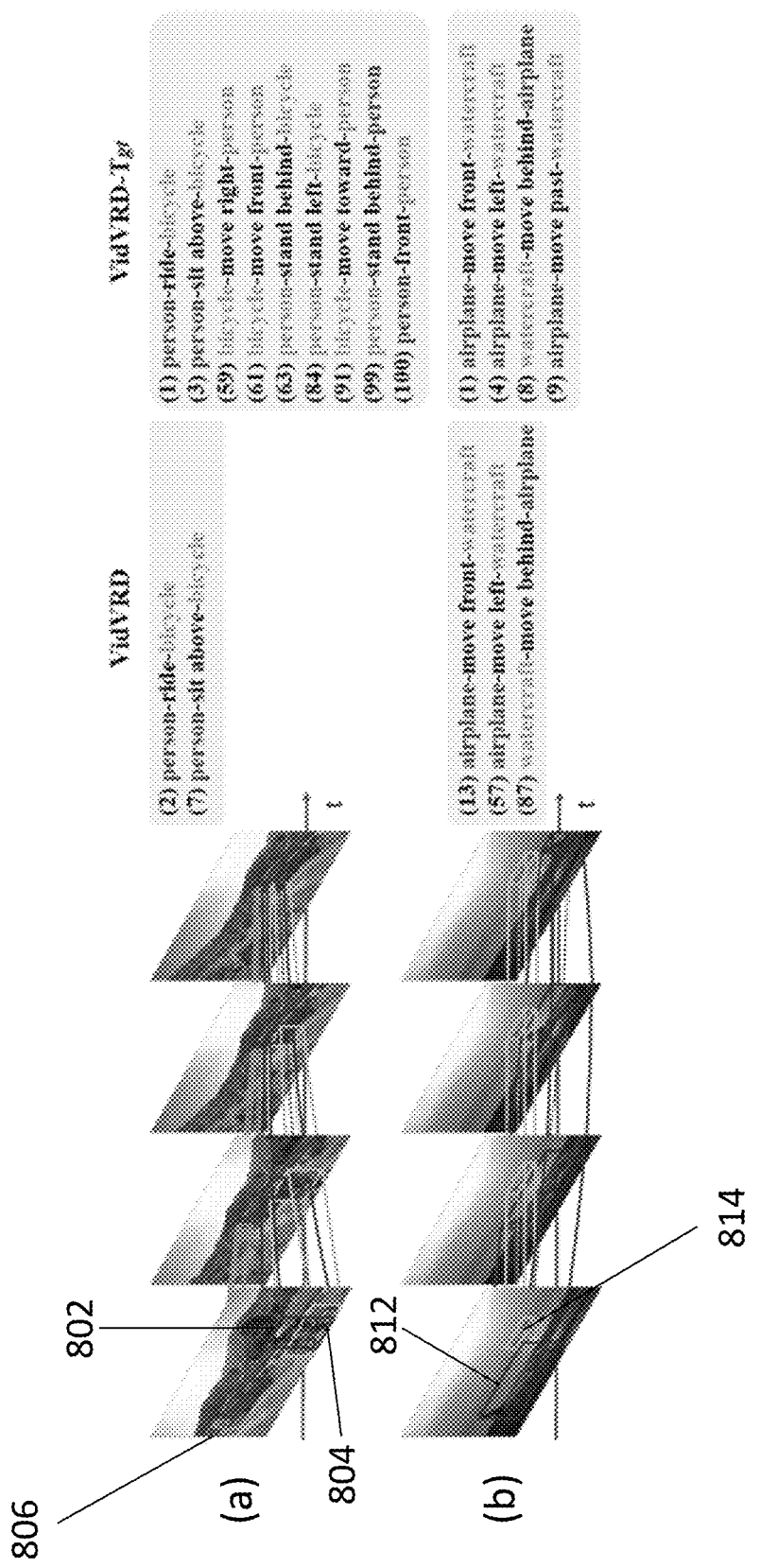
FIGS. 8a and 8b show failure examples of a video visual relation detection method.
Figure 9:
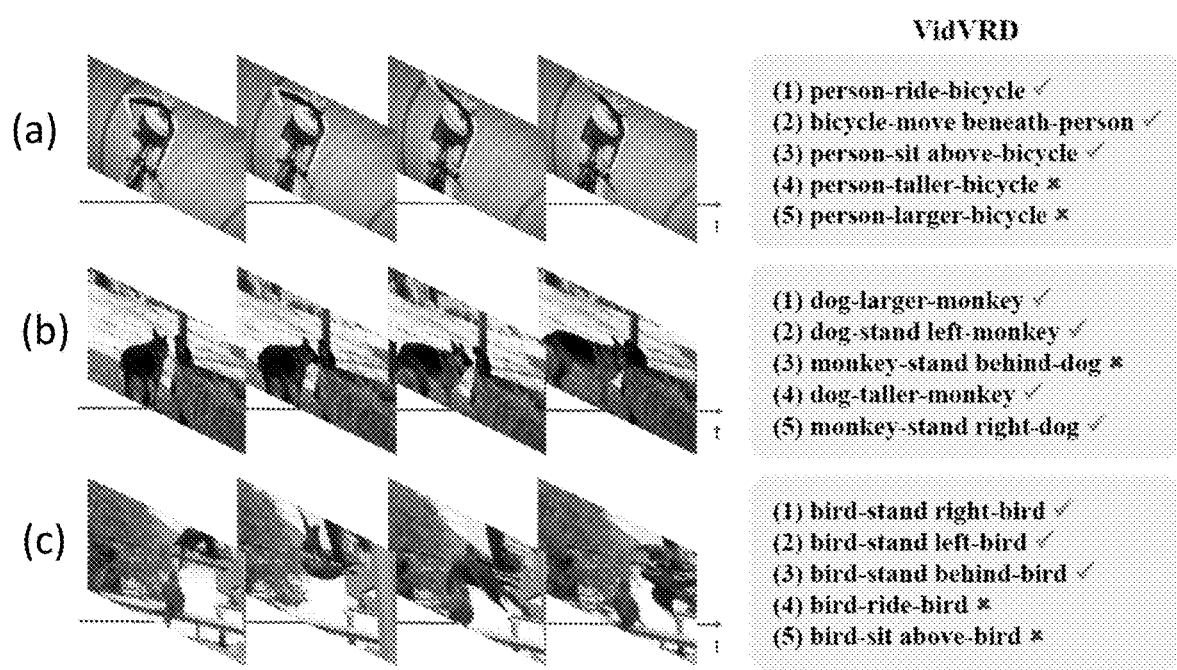
FIGS. 9a to 9c show examples of relation tagging using methods according to embodiments of the present invention.

FIG. 5 schematically illustrates the relation prediction used in embodiments of the present invention. A tracklet 512 for a first object $\mathcal{T}_s$ and tracklet 522 for a second object $\mathcal{T}_o$ are used to extract dense trajectory features 514 for the first object $\mathcal{T}_s$ and dense trajectory features 524 for the second object $\mathcal{T}_o$. As described above, the dense trajectory features may be extracted with HoG, HoF and MBH. Appearance features 516 of the first object $\mathcal{T}_s$ and appearance features 526 for the second object $\mathcal{T}_o$ are extracted using classeme labels. Relative characteristics of the first object $\mathcal{T}_s$ and the second object $\mathcal{T}_o$ are extracted as a relativity feature 530. The features are encoded as a relation feature 540. Based on the relation feature 540 separate predictors for the subject 542, predicate 544 and object 546 are trained to give short-term relations 550 under softmax 552 loss.

It is envisaged that embodiments of the present invention may be applied to key-phrase based video search, visual question-answering (VQA), video captioning and surveillance.

Current search engines only provide keyword based video search. They cannot support the user queries with complex semantic meaning. For example, if a user wants to search a specific video about "bison chase lion" and inputs the phrase as the query, search engines may return the videos about "lion chase bison" because these videos are more common than those about "bison chase lion" and their descriptions all contain the input keywords. In contrast, the methods described in this disclosure can automatically generate relation-level descriptions for videos. These descriptions can effectively distinguish the user queries with same keywords but different meanings, such as "bison chase lion" and "lion chase bison". It can support key-phrase based user queries beyond keyword based ones.

The methods described in this disclosure can effectively support various VQA tasks. For example, it can automatically annotate visual relations with durations on videos. It means that the invention can provide fine-grained video annotation on video clips rather than whole videos. In this way, when a user inputs a question "How does a bison chase a lion", a VQA system can extract the phrase "bison chase lion" from the query and return the video clips annotated with the phrase. Moreover, the invention can localize the objects in visual relations. Hence, when a user asks "What is in front of lion", a VQA system can search the annotated visual relations in the format of "*-in front of-lion" and return the subjects.

Current image and video captioning methods depend on the labeling quality of training set seriously. If there are no similar videos in the training set to a given video, the given video cannot be described well using the existing captioning methods. The invention can provide more comprehensive understanding of visual content beyond objects, which helps to generate more accurate descriptions on videos.

The methods described in this disclosure can be used in various surveillance cases. For example, traffic surveillance sometimes requires monitoring of the spatial relationship between two vehicles, and the relation between a vehicle and a traffic sign to detect possible traffic violation. For the surveillance in shopping stores, automatically detecting certain relations between customers and goods can be helpful to discover and avoid illegal behavior. It would be also very useful for the novel retailer stores without checkout, like amazon go, which requires computer vision technology to detect some common shopping behavior, such as picking up, putting back and exchanging.

In the following, evaluation of the video visual relation detection methods is described. We construct the first evaluation dataset for VidVRD based on the training set and validation set of ILSVRC2016-VID, which contains videos with the manually labeled bounding boxes for 30 categories of objects. After carefully viewing and analyzing the contents of videos, we selected 1,000 videos which contain clear and plentiful visual relations, while the videos with single object and ambiguous visual relations were ignored. We randomly split the video set into the training set and test set, which contain 800 videos and 200 videos, respectively.

Based on the 1,000 videos, we supplement the 30 object categories by the addition of 5 object categories that frequently appearing in visual relations, namely person, ball, sofa, skateboard and frisbee. All the resulting 35 object categories describe independent object, i.e., we do not include the part-of relationship between objects, such as "bicycle-with-wheel", in the constructed dataset.

Next, we build the set of predicate categories as follows: we directly use transitive verbs as predicate, such as "ride"; we transfer the adjectives to predicates in the format of comparative, such as "faster"; and we manually de ne common spatial predicates from camera viewpoints to ensure consistency, such as "above". While intransitive verbs usually describe the attributes of objects only, they are expressive in relation representation. For example, "walk behind" provides more information than "behind" in visual relation. Thus, we also include the combination of intransitive verbs and spatial predicates, as well as the combination of an intransitive verb and "with", which represents two objects acting in the same manner. We exclude prepositions in the predicate definition, because the prepositions of spatial kind can be covered by the defined spatial predicates, while the remaining types of prepositions are mainly related to part-of relationship, which has already been excluded according to the object definition. According to the above predicate definition mechanism and video content, we selected 14 transitive verbs, 3 comparatives, 11 spatial descriptors, and 11 intransitive verbs, which is able to derive 160 categories of predicates. In our constructed dataset, 132 predicate categories appear in the videos.

Eight volunteers contributed to video labeling, and another two volunteers took charge of labeling checking. In object labeling phase, the objects belonging to the additional five categories in all the videos were manually labeled with their categories and bounding box trajectories. In predicate labeling phase, in order to consider the fact that visual relations are temporally changeable, all videos were decomposed into segments of 30 frames with 15 overlapping frames in advance. Then, all the predicates appearing in each segment were required to be labeled to obtain segment-level visual relation instances. To save labeling labor, we only labeled typical segments in the training set and all the segments in the test set. For the test set, the visual relation instances in adjacent segments with the same object pairs and predicate were automatically linked to generate the video-level visual relation instances.

Table 1 shows the statistics of the constructed VidVRD dataset. Overall, our dataset contains a total of 3,219 relation triplets (i.e. the number of visual relation types), and the test set has 258 relation triplets that never appear in the training set. At the instance level, the test set contains 4,835 visual relation instances, among which 432 instances are unseen in the training set. Note that although the videos in the test set are fully labeled, there is still a small portion of content without any visual relation because some parts of these videos contain less than two objects. From the segment-level statistics available in the lower part of Table 1, the numbers of visual relation instances per segment in our dataset is 9.5, which is higher than 7.6 instances per image in the Visual Relationship dataset, suggesting that our dataset is more completely labeled.

TABLE 1

Statistics of our VidVRD dataset. The number of video-level visual relation instances is not available for training set because it is only sparsely labeled.

|  | training set | test set |
| --- | --- | --- |
| video | 800 | 200 |
| subject/object category | 35 | 35 |
| predicate category | 132 | 132 |
| relation triplet | 2,961 | 1,011 |
| visual relation instance (video-level) | — | 4,835 |
| segment | 15,146 | 3,202 |
| labeled segment | 3,033 | 2,801 |
| visual relation instance (segment-level) | 25,917 | 29,714 |

Described above, the input of VidVRD is a given video, and its output is a set of visual relations with localized objects. Similar to ImgVRD, a detected visual relation instance is treated as correct in VidVRD, if it contains the same relation triplet as in the ground truth and both the bounding box trajectories of its subject and object have sufficiently high vIoU as compared to those in the ground truth. In our experiments, the overlapping threshold of vIoU is set to 0.5.

Considering that object localization in videos is still an open problem, we also evaluate our method under a different task, named visual relation tagging. Its input is also a given video, but its output is a set of visual relation triplets annotated to the whole video without the requirement of object localization. Obviously, visual relation tagging reduces the influence of object location in performance evaluation, and it can effectively support various visual relation based applications, such as video retrieval and visual question answering.

Note that we do not conduct experiments on the tasks of predicate detection and phrase detection. For predicate detection, it requires the localized objects with their categories as the input in order to predict a set of possible predicates, which is easier than relation tagging in practice and less feasible in real applications. For phrase detection, it aims to predict a set of relation triplets and localize each entire visual relation instance with one bounding box trajectory. Similar to relation detection, its performance is also influenced by the accuracy of object localization in videos; moreover, it is less challenging than the relation detection as it only requires to provide the union bounding box trajectory.

Mean average precision (mAP) is used as an evaluation metric for visual relation detection, which is widely used for detection tasks. However, this metric is discarded in the previous VRD evaluation because of incomplete relation labeling of dataset, which does not exist in the construction of our dataset. We also use Recall@K (K equals 50 and 100) as the evaluation metrics for visual relation detection; it denotes the fraction of correct visual relation instances detected in the top K detection results. In visual relation tagging, we use Precision@K as the evaluation metric to emphasize the ability of tagging accurate visual relations.

Since the average number of relation triplets per video is 10.34 in our dataset, we set K to 1, 5 and 10 in the experiments.

Relation prediction is the key module in our proposed method, which consists of two main components: relation feature extraction and relation modeling. We validate their influences in the performance of our method.

Our proposed method extracts two types of features for VidVRD: object feature and relativity feature. The former includes object classeme and iDTs extracted from each object tracklet, and the latter includes the relative position, size and motion between a pair of object tracklets. As object classeme is crucial to subject and object prediction, we keep it in the component analysis of feature extraction, and generate three baselines: only using object classeme (VidVRD-C), using object classeme and iDT (VidVRD-CT) and using object classeme and relativity feature (VidVRD-CR).

The top three rows in Table 2 show the performances of these three baselines. We can see that both iDT and relativity feature can complement object classeme; and our method VidVRD obtains the best performance when fusing all the features. It shows that all the components of our relation features are effective in VidVRD.

TABLE 2

Evaluation of our method with different components on visual relation detection and visual relation tagging. R@K and P@K are abbreviations of Recall@K and Precision@K, respectively.

| Method | relation detection | | | relation tagging | | |
|---|---|---|---|---|---|---|
| | R@50 | R@100 | mAP | P@1 | P@5 | P@10 |
| VidVRD-C | 7.43 | 9.82 | 9.85 | 30.00 | 22.60 | 16.33 |
| VidVRD-CT | 8.00 | 10.42 | 9.63 | 31.00 | 23.50 | 18.55 |
| VidVRD-CR | 8.00 | 10.42 | 11.44 | 41.00 | 27.50 | 19.00 |
| VidVRD-M | 2.23 | 3.58 | 2.84 | 17.00 | 11.30 | 9.05 |
| VidVRD | 8.75 | 10.84 | 11.47 | 43.00 | 28.90 | 20.80 |
| VidVRD-$T_{gt}$ | 14.91 | 20.23 | 16.70 | 43.50 | 29.70 | 23.20 |

Our proposed method explores the interdependency of subject, predicate and object prediction by joint modeling. It combines the predictions of the three components to optimize the rank of relation triplets instead of their ranks independently. To validate its effectiveness, we generate a baseline by modeling subject, predicate and object independently (VidVRD-M).

The fourth row in Table 2 shows the performance of VidVRD-M. We can see that the performance of VidVRD-M has significantly degraded in both the visual relation detection and visual relation tagging as compared to all other variants of VidVRD. This validates the necessity of exploring the interdependency of subject, predicate and object prediction.

As mentioned above, a technical challenge in VidVRD is that VidVRD requires to localize objects with bounding box trajectories. Yet it is still an open problem in video analysis. To validate the influence of object localization on our performance, we generate a baseline by using the ground truth object trajectories (VidVRD-$T_{gt}$). These object trajectories are divided into object tracklets in video decomposition, and only the ones across the segments are retained for feature extraction. Note that only object trajectory is provided in this baseline, and the object category of each trajectory is not given.

The bottom row in Table 2 shows the performance of the baseline. We see that the ground truth object trajectories can obviously improve the performance in visual relation detection, but only slightly improve the performance of visual relation tagging because its output does not require object localization. It shows that object localization is still a major constraint in VidVRD.

We compare the performance of our proposed method with four state-of-the-art methods: Visual Phrase (VP) (Mohammad Amin Sadeghi and Ali Farhadi. 2011. "Recognition using visual phrases", IEEE Conference on Computer Vision and Pattern Recognition. IEEE, 1745-1752), Lu's only V (Lu's-V) and Lu's (Both described in Cewu Lu, Ranjay Krishna, Michael Bernstein, and Li Fei-Fei. 2016. "Visual relationship detection with language priors", European Conference on Computer Vision. Springer, 852-869) and VTransE (Hanwang Zhang, Zawlin Kyaw, Shih-Fu Chang, and Tat-Seng Chua. 2017. "Visual translation embedding network for visual relation detection" arXiv: 1702.08319 (2017). Since these methods all aimed at ImgVRD, they only focus on feature extraction for still images but ignore dynamic features in videos. Moreover, most methods only retain the top one confident relation prediction for each object pair in order to obtain high recall on the incomplete labeled evaluation dataset, such as Visual Relationship dataset and Visual Genome.

We extend these methods to satisfy the requirements of VidVRD on our constructed dataset for fair comparison. First, we replace the original features in these methods with the relation features extracted on the object tracklets in our method. Specifically, the relativity features are not used in VP, because it focuses on localizing each visual relation instance with an entire bounding box rather than providing two separate bounding boxes for subject and object, and hence the relativity between subject and object is not applicable to VP. Second, we retain multiple relation predictions with top confidence for each object pair in order to avoid low recall on our fully labeled dataset. In our experiments, we set the number of retained relation predictions for each object pair to 20, which is the same as the setting in our method. Third, we associate the segment-level relation predictions of these methods with our greedy relational association strategy and generate the final video visual relations.

FIGS. 6 to 9 show qualitative results of the comparison of the VidVRD method with other methods and table 3 below shows quantitate results.

TABLE 3

Evaluation of different methods on visual relation detection and visual relation tagging.

| Method | relation detection | | | relation tagging | | |
|---|---|---|---|---|---|---|
| | R@50 | R@100 | mAP | P@1 | P@5 | P@10 |
| VP | 3.16 | 4.53 | 2.97 | 36.50 | 25.55 | 19.20 |
| Lu's-V | 2.52 | 4.03 | 3.45 | 20.00 | 12.60 | 9.55 |
| Lu's | 2.79 | 4.92 | 3.78 | 20.50 | 16.30 | 14.05 |
| VTransE | 1.86 | 3.60 | 2.23 | 15.00 | 10.00 | 7.65 |
| VidVRD | 8.75 | 10.84 | 11.47 | 43.00 | 28.90 | 20.80 |

FIGS. 6a to 6c show video sequences used for qualitative comparisons of visual relation detection. FIG. 6a shows a video sequence with 4 zebras 602, 604, 606 and 608. FIG. 6b shows a video sequence with a person 612 and a dog 614. FIG. 6c shows a sequence with three cattle 632, 634 and 636.

FIGS. 7a to 7c show the visual relation instances detected by different methods for the video sequences shown in FIGS. 6a to 6c respectively. The correct visual relation instances in the top 100 results are shown, and their ranks are marked in front of them with parentheses. Note that the object localization results are not shown due to space limitation, but they are all required to have sufficiently high vIoUs to the ground truth object trajectories.

FIGS. 8a and 8b show failure examples of the video visual relation detection method. FIG. 8a shows a video sequence of a first person 802 riding a bicycle 804 with a second person 806 in the distance and the video visual relations detected by the VidVRD method and the VidVRD method using ground truth object trajectories (VidVRD-$T_{gt}$). FIG. 8b shows a video sequence of an aircraft 812 and a watercraft 814 and the video visual relations detected by the VidVRD method and the VidVRD method using ground truth object trajectories (VidVRD-$T_{gt}$).

FIGS. 9a to 9c show examples of relation tagging using methods according to embodiments of the present invention. The top 5 results from the relations tagging are shown and the correct and incorrect results are marked with ticks and crosses, respectively.

1) Our method is superior to the state-of-the-art baselines on both visual relation detection and visual relation tagging. Specifically for visual relation detection, our method improves the performance by 7.69% and 5.92% on mAP and Recall@100 respectively as compared to the top baseline (Lu's); and on visual relation tagging, our method improves by 6.5% in Precision@1 compared to the top baseline (VP).

2) Our relation features can help the proposed method and all the baselines to effectively detect the specific visual relations in videos. For example, our method together with four baselines detect the visual relation "zebra-follow-zebra" in FIG. 7a. It requires the use of dynamic video features to distinguish the predicate from "follow" to "stand (on the) left (of)". Another example of the effectiveness of our relation features is illustrated in FIG. 7b, which shows the successful detection of the changes of the person's state from "stand" (rank (7)) to "walk" (rank (9)) and the dog's action from "watch" (rank (33)) to "play" (rank (13)).

3) Object tracklet proposal used in our method can provide approximate object positions, which helps to detect the coarse spatial relations. FIG. 7c shows the effectiveness of our method, in which 10 spatial relations combined with the subjects' actions are correctly detected. However, inaccurate object localization prevents the detection of visual relation instances that require fine-grained position description, such as "towards" and "past". FIGS. 8a and 8b show two examples that our method fails to detect the visual relation "bicycle-move towards-person" and "airplane-move past-watercraft". If we were to use the ground truth object trajectories as the input (i.e., VidVRD-$T_{gt}$ in Table 2), these visual relations would be correctly detected. Moreover, we can see from FIGS. 9a to 9c that accurate object localization can help to detect more visual relation instances and improve the ranks as well.

Since it is impractical to collect and label all possible relation triplets, a promising VidVRD method should be able to predict unseen visual relations. With this in mind, we compare our proposed method with the baseline in zero-shot learning setting. As noted earlier, our test set contains 258 relation triplets out of 1,011 that never appear in our training set, such as "dog-sit behind-person". It means that 25.5% of relation triplets are unseen to the visual relation detectors.

We report the zero-shot results in Table 4. VP is not included in the comparison because it can only detect seen visual relation triplets and is not applicable to zero-shot learning. We can see that our method significantly surpasses the baselines that only use visual features: Lu's-V and VTransE, and is slightly worse than Lu's in mAP of visual relation detection as it exploits language priors. Moreover, as compared to Table 3, the performances of all the methods degrade drastically, though the random guess performs even worse (e.g. Recall@100 is less than 0.062%). For example, our method has 6.44% drop in Recall@100 for visual relation detection and 38.89% drop in Precision@1 for visual relation tagging. It shows that zero-shot learning is challenging when the unseen relation ratio is high.

TABLE 4

Evaluation of different methods on zero-shot visual relation detection and visual relation tagging. Note that VP does not applicable to zero-shot learning for it can only detect a whole relation.

| Method | relation detection | | | relation tagging | | |
| --- | --- | --- | --- | --- | --- | --- |
| | R@50 | R@100 | mAP | P@1 | P@5 | P@10 |
| Lu's-V | 0.93 | 1.16 | 0.41 | 2.74 | 0.82 | 0.82 |
| Lu's | 0.69 | 1.62 | 0.51 | 1.37 | 1.37 | 1.23 |
| VTransE | 0.69 | 0.93 | 0.17 | 1.37 | 1.37 | 0.96 |
| VidVRD | 2.78 | 4.40 | 0.44 | 4.11 | 1.92 | 1.92 |

As described above, a new vision task named VidVRD, which aims to detect all visual relation instances in form of the relation triplets and object trajectories in videos has been proposed. To handle the technical challenges in VidVRD, we presented a method consists of object tracklet proposal, relation prediction and greedy relational association. Moreover, we constructed a VidVRD dataset containing 1,000 videos with manually labeled visual relations. The experimental results on the dataset demonstrated that our method outperforms the state-of-the-art baselines on both visual relation detection and visual relation tagging.

Whilst the foregoing description has described exemplary embodiments, it will be understood by those skilled in the art that many variations of the embodiments can be made within the scope and spirit of the present invention.

The invention claimed is:

1. A video processing method of detecting visual relations in a video sequence, the method comprising:
    decomposing the video sequence into a plurality of segments, each segment comprising a plurality of successive frames corresponding to a temporal portion of the video sequence and each segment overlapping with one or more neighboring segments by at least one frame;
    for each segment,
        detecting objects in frames of the segment;
        tracking the detected objects over the segment to form a set of object tracklets for the segment;
        for the detected objects, extracting object features;
        for pairs of detected objects, wherein each pair of detected objects comprises a first object which serves as a subject and a second object which serves as an object, extracting relativity features indicative of a relation between the subject and the object;
        forming relation feature vectors for pairs of detected objects in the segment using the object features of objects corresponding to respective pairs of object tracklets and the relativity features of the respective pairs of detected objects; and
        generating a set of segment relation prediction results for the segment from the relation features vectors;
    generating a set of visual relation instances, corresponding to pairs of subject and object, for the video sequence by merging the segment relation prediction results from different segments; and generating a set of visual relation detection results, corresponding to pairs of subject and object, from the set of visual relation instances.

2. A method according to claim 1, wherein each segment has a length of frames L and the length of overlap is L/2.

3. A method according to claim 1, wherein the visual relation detection results comprise a set of indications of a relation subject, a relation predicate and a relation object, wherein the relation subject and the relation object are detected objects and the relation predicate indicates a relation between the relation subject and the relation object.

4. A method according to claim 1, wherein the object tracklets comprise a bounding box in each of a plurality of frames of the segment and a trajectory for the bounding box across the plurality of frames of the segment.

5. A method according to claim 1, wherein the relation between the subject and the object corresponding to the pair of object tracklets, comprises at least one of the relative size, the relative position and the motion between the subject and object.

6. A method according to claim 1, wherein generating the set of visual relation detection results from the set of visual relation instances comprises ranking the visual relation instances according to a confidence score and selecting the visual relation instances having the highest confidence scores as the visual relation detection results.

7. A method according to claim 1, wherein merging the segment relation prediction results from different segments comprises applying a greedy algorithm to merge pairs of object tracklets across successive segments.

8. A method according to claim 1, wherein generating the set of segment relation prediction results from the relation features vectors comprises applying a softmax function to set of relation feature vectors.

9. A method according to claim 1, wherein detecting objects in frames of the segment comprises detecting objects belonging to one of a set of pre-defined categories.

10. A method according to claim 1, wherein the visual relations comprise at least one dynamic relation which changes across the video sequence.

11. A computer readable medium carrying processor executable instructions which when executed on a processor cause the processor to carry out a method according to claim 1.

12. A video processing system comprising a processor and a data storage device, the data storage device storing computer executable instructions operable by the processor to:
decompose a video sequence into a plurality of segments, each segment comprising a plurality of successive frames corresponding to a temporal portion of the video sequence and each segment overlapping with one or more neighboring segments by at least one frame;
for each segment,
detect objects in frames of the segment;
track the detected objects over the segment to form a set of object tracklets for the segment;
for the detected objects, extract object features;
for pairs of detected objects, wherein each pair of detected objects comprises a first object which serves as a subject and a second object which serves as an object, extract relativity features indicative of a relation between the subject and the object;
form relation feature vectors for pairs of detected objects in the segment using the object features of objects corresponding to respective pairs of object tracklets and the relativity features of the respective pairs of detected objects; and
generate a set of segment relation prediction results for the segment from the relation features vectors;
generate a set of visual relation instances, corresponding to pairs of subject and object, for the video sequence by merging the segment relation prediction results from different segments; and
generate a set of visual relation detection results, corresponding to pairs of subject and object, from the set of visual relation instances.

13. A video processing system according to claim 12, wherein each segment has a length of frames L and the length of overlap is L/2.

14. A video processing system according to claim 12, wherein the visual relation detection results comprise a set of indications of a relation subject, a relation predicate and a relation object, wherein the relation subject and the relation object are detected objects and the relation predicate indicates a relation between the relation subject and the relation object.

15. A video processing system according to claim 12, wherein the object tracklets comprise a bounding box in each of a plurality of frames of the segment and a trajectory for the bounding box across the plurality of frames of the segment.

16. A video processing system according to claim 12, wherein the relation between the subject and the object corresponding to the pair of object tracklets, comprises at least one of the relative size, the relative position and the motion between the subject and the object.

17. A video processing system according to claim 12, wherein the data storage device comprises instructions operable by the processor to generate the set of visual relation detection results from the set of visual relation instances by ranking the visual relation instances according to a confidence score and selecting the visual relation instances having the highest confidence scores as the visual relation detection results.

18. A video processing system according to claim 12, wherein the data storage device comprises instructions operable by the processor to merge the segment relation prediction results from different segments by applying a greedy algorithm to merge pairs of object tracklets across successive segments.

19. A video processing system according to claim 12, wherein the data storage device comprises instructions operable by the processor to generate the set of segment relation prediction results from the relation features vectors by applying a softmax function to set of relation feature vectors.

20. A video processing system according to claim 12, wherein the data storage device comprises instructions operable by the processor to detect objects in frames of the segment by detecting objects belonging to one of a set of pre-defined categories.

* * * * *